US009265204B2

(12) United States Patent
Younis et al.

(10) Patent No.: US 9,265,204 B2
(45) Date of Patent: Feb. 23, 2016

(54) REMOTELY SENSING AND ADAPTING IRRIGATION SYSTEM (71) Applicants: Saed G. Younis, San Diego, CA (US); Ali S. Younis, San Diego, CA (US)

(72) Inventors: Saed G. Younis, San Diego, CA (US); Ali S. Younis, San Diego, CA (US)

(73) Assignee: Younis Technologies, Inc., San Diego, CA (US)

( * ) Notice: Subject to any disclaimer, the term of this patent is extended or adjusted under 35 U.S.C. 154(b) by 516 days.

(21) Appl. No.: 13/720,733

(22) Filed: Dec. 19, 2012

(65) Prior Publication Data
US 2013/0153673 A1    Jun. 20, 2013

Related U.S. Application Data (60) Provisional application No. 61/577,557, filed on Dec. 19, 2011.

(51) Int. Cl.
*A01G 25/16* (2006.01)

(52) U.S. Cl.
CPC ............ *A01G 25/165* (2013.01); *A01G 25/16* (2013.01)

(58) Field of Classification Search
USPC ............. 700/12, 16, 231, 284, 159, 158, 108; 455/456.3; 345/501; 701/50
See application file for complete search history.

(56) References Cited

U.S. PATENT DOCUMENTS

| 4,795,092 | A | | 1/1989 | Fuller | |
|---|---|---|---|---|---|
| 5,246,164 | A | * | 9/1993 | McCann et al. | 239/11 |
| 5,927,603 | A | * | 7/1999 | McNabb | A01G 25/167 239/63 |
| 6,250,564 | B1 | | 6/2001 | Chahley | |
| 6,611,289 | B1 | * | 8/2003 | Yu et al. | 348/265 |

(Continued)

FOREIGN PATENT DOCUMENTS

| CN | 101099446 A | 1/2008 |
|---|---|---|
| CN | 101999306 A | 4/2011 |

(Continued)

OTHER PUBLICATIONS

Njoku et al. "Passive Microwave Remote Sensing of Soil Moisture." Journal of Hydrology. Aug. 1994, 33 pages.
Wang et al. "Satellite Remote Sensing Applications for Surface Soil Moisture Monitoring: A Review." Front. Earth Sci. China 2009. 3(2):237-247. Accepted Jan. 19, 2009.

(Continued)

*Primary Examiner* — Kidest Bahta
(74) *Attorney, Agent, or Firm* — Procopio, Cory, Hargreaves & Savitch LLP (57) ABSTRACT

An irrigation system continuously monitors status of lawns or plants under its care and directs water to where it is needed when it is needed to maintain lawn or plant health. The system can significantly reduce water usage, unnecessary seepage, and runoff. A water nozzle with a pan and tilt capability can direct water where it is needed. An image sensor can continually take and analyze images of the lawns or plants to determine watering needs. The image sensor can also monitor where the water is landing while the irrigation system is delivering water to the lawns or plants. This information can be used to adjust the water delivery aim to ensure that the intended spots are accurately irrigated. A laminar flow nozzle with minimal flow dispersion can improve water deliver accuracy and detection of where the water lands.

19 Claims, 3 Drawing Sheets

(56) References Cited

U.S. PATENT DOCUMENTS

| | | | |
|---|---|---|---|
| 6,928,339 B2* | 8/2005 | Barker | 700/284 |
| 7,010,390 B2* | 3/2006 | Graf et al. | 700/245 |
| 7,584,023 B1* | 9/2009 | Palmer et al. | 700/284 |
| 7,835,832 B2* | 11/2010 | Macdonald | A01B 69/008 701/24 |
| 8,028,470 B2* | 10/2011 | Anderson | A01G 25/09 47/48.5 |
| 2006/0027677 A1* | 2/2006 | Abts | 239/67 |
| 2007/0267524 A1 | 11/2007 | Mack | |
| 2010/0032493 A1 | 2/2010 | Abts et al. | |
| 2012/0273587 A1* | 11/2012 | Hitt | 239/63 |

FOREIGN PATENT DOCUMENTS

| | | |
|---|---|---|
| EP | 1393619 A1 | 3/2004 |
| WO | 2011002307 A2 | 1/2011 |

OTHER PUBLICATIONS

International Search Report and Written Opinion for related international application No. PCT/US2012/070695, mailed on Apr. 26, 2013, in 15 pages.

Office Action and Search Report dated Jul. 9, 2015 for related CN Patent Application No. CN 201280062812.8 in 9 pages.

* cited by examiner

REMOTELY SENSING AND ADAPTING IRRIGATION SYSTEM

CROSS-REFERENCE TO RELATED APPLICATIONS

This application claims the benefit of U.S. provisional application Ser. No. 61/577,557, filed Dec. 19, 2011, which is hereby incorporated by reference.

BACKGROUND

The majority of lawn and plant irrigation systems are controlled based on timing. Under this method, a controller is programmed so that water is delivered during set times and for set durations. For optimal operation and water savings, the operator has to frequently adjust the frequency and duration of the watering to adjust for varying weather, soil conditions, and plant conditions. Such adjustments by the users are seldom performed and most users end up overwatering their lawns and plants in an attempt to ensure plant health despite varying conditions. This wastes a great deal of water both on the individual level and in the aggregate on a municipal level.

In addition, lawns are generally irrigated using sprinkler heads that tend to send water in a radial or angular distribution making it difficult to uniformly irrigate a given lawn or plant area. Under such non-uniform irrigation, the user ends up over-irrigating some areas to ensure that less irrigated areas get enough water to maintain greenness. Furthermore, sprinklers deliver water in way that is easily misdirected by moderate wind.

Recently drip irrigation has been increasingly utilized for planter areas. While drip irrigation can reduce water consumption compared to sprinklers, the same overwatering still occurs since the need for frequent monitoring and adjusting of watering schedules, which is tedious and seldom performed, remains. In addition, drip irrigation is not used for lawn areas, which frequently consume the most irrigation water.

Furthermore, both sprinkler and drip irrigation systems require installing a grid of irrigation pipes and tubes that are mostly installed underground resulting in high cost.

Thus, currently utilized irrigation systems do not adjust to conditions and hence tend to overwater, they do not accurately deliver water and hence they tent to waste water, and they do not uniformly deliver water and hence tend to overwater. Also, installation of most of these systems is costly because the installation requires underground pipe burials.

Additionally, the current systems do not accurately adjust the duration or timing of the watering based on the condition of the lawns or plants and are unable to water one small spot more or less than the rest of the area based on the plant or lawn needs of that spot since the user rarely, due to the tediousness of the task, readjusts the watering proportion within a sprinkler system once the system is installed.

SUMMARY

The invention, in an embodiment, provides an irrigation system that continuously monitors with a remote sensor the status of the lawns or plants under its care and directs water where and when it is needed to maintain lawn or plant health as well as significantly reducing water usage, unnecessary seepage, and runoff. The system uses a remote sensor, such as a camera, to continually take and analyze imagery of the lawns or plants under its care to determine watering needs. The system uses a water delivery method that can precisely direct water, such as a water nozzle with pan and tilt capability. The remote sensor also monitors where the water is landing when the irrigation system is delivering water. This information is used by the system to continually adjust its water delivery aim to continually hone in its water delivery accuracy. In addition the system keeps a log of the amount of water delivered to each spot within the area under its care using an inline water flow meter. The system may recommend or automatically deliver fertilizer or pest control solutions to individual spots as needed based on the sensor data and care history. The system also keeps track of the amount of water delivered to each spot in the area under its care. If the system detects that the same spot, after repeated watering, fails to become green, it marks this spot as needing a gardener's intervention, alerts the user of such a determination, and stops watering this spot until instructed otherwise by the user.

In an aspect, the invention provides an irrigation system. The irrigation system includes: an image sensor configured to capture images of an irrigation area, the irrigation area being an area to be cared for by the irrigation system; a steerable water delivery system configured to direct streams of water to the irrigation area; and a controller unit coupled to the image sensor and the steerable water delivery system and configured to receive images from the image sensor, determine locations to water in irrigation area, and direct the steerable water delivery system to deliver water to the determined locations.

In an aspect, the invention provides a method for operating an irrigation system. The method includes: determining whether the current time is appropriate for watering; acquiring one or more images of an irrigation area, the irrigation area being an area to be cared for by the irrigation system; determining locations in the irrigation area that need watering based at least in part on the acquired images; determining whether to water the locations determined to need watering; and watering the determined locations, when it is determined to water the locations determined to need watering.

In an aspect, the invention provides a method for setting up an irrigation system. The method includes: acquiring one or more images of an irrigation area using an image sensor, the irrigation area being an area to be cared for by the irrigation system; determining the extent of the irrigation area based at least in part on the acquired images; estimating the location of a steerable water delivery system relative to the irrigation area; directing the steerable water delivery system to deliver water to plurality of points in the irrigation area; determining locations of the plurality of points using images of the irrigation area; determining calibration information for the steerable water delivery system using the determined locations of the plurality of points; and saving the calibration information and the extent of the irrigation area for use in operating the irrigation system.

DETAILED DESCRIPTION

Figure 1:
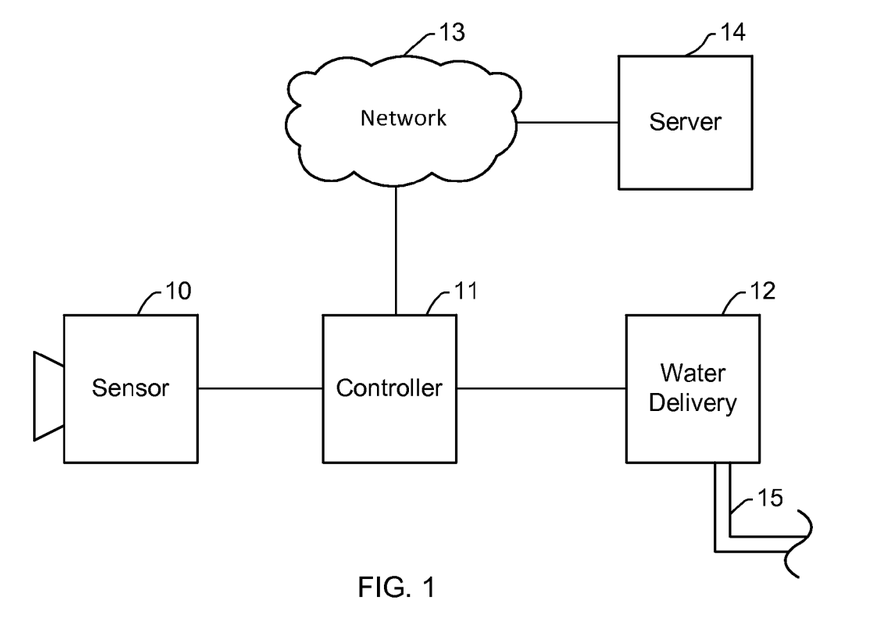
FIG. 1 is a block diagram of an irrigation system in accordance with aspects of the invention.

FIG. 1 is a block diagram of an irrigation system. The irrigation system includes a sensor unit 10. The sensor unit 10 may be, for example, a video camera. The sensor unit 10 is coupled to a controller unit 11. The controller unit 11 is coupled to a steerable water delivery system 12. Water is delivered to the steerable water delivery system 12 from a water supply 15. The water supply 15 can be, for example, from a water tap through a standard water hose or from other piping systems. The controller unit 11 may control the steerable water delivery system 12 based on images from the sensor unit 10.

The controller unit 11 is also coupled to a network 13. The network 13 may be a local area network. The network 13 is also coupled to a server 14. Accordingly, the controller unit 11 and the server 14 can communicate. The server 14 may aid in system monitoring and installation by the user. The server 14 may, for example, be a personal computer. The server 14 may also be an Internet-connected cloud-based server. The connections between the various units may be wireless or wired connections that are capable of carrying data traffic. The connections may use communication standards, such as Ethernet, wireless Ethernet, or universal serial bus (USB). A combination or wired and wireless connections may be used, for example, wired connections between the controller unit 11 and the sensor unit 10 and steerable water delivery system 12 with the network 13 being wireless. The connections that carry data may additionally carry power in some implementations. Other connections between units may be used, for example, the sensor unit 10 and the steerable water delivery system 12 may be coupled to the controller unit 11 via the network 13.

Figure 2:
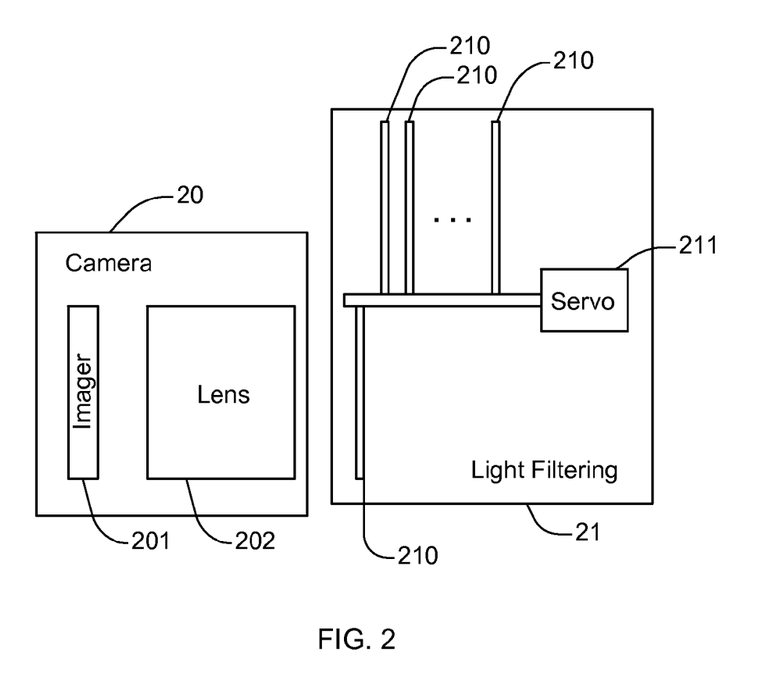
FIG. 2 is a block diagram of a camera sensor subsystem in accordance with aspects of the invention.

FIG. 2 is a block diagram of a camera sensor subsystem. The sensor unit 10 of the irrigation system of FIG. 1 may be, for example, implemented using the camera sensor subsystem of FIG. 2. The camera sensor subsystem includes a video camera 20. Alternatively, the camera sensor subsystem may include a still-image camera. The video camera 20 contains a video imager 201, such as a CCD or CMOS imaging sensor. The video camera 20 also contains a focusing lens system 202. The focusing lens system 202 may have a fixed or variable focal length. The focusing lens system 202 is preceded by a light filtering unit 21. The light filtering unit 21 contains multiple light filters 210. Each of the light filters 210 allows different parts of the light spectrum to pass through. The light filtering unit 21 contains a servo system 211 that can place one or more of the light filters 210 in front of the focusing lens system 202. The servo system 211 may be controlled, for example, by the controller unit 11 of FIG. 1. In an embodiment, the camera sensor subsystem does not include the light filtering unit 21 and uses only visible light images. Alternatively, a camera sensor subsystem may use a dedicated, narrow-spectral imager. Further, the video camera 20 may be pointable, for example, by being mounted on a pointing turret.

The irrigation system, in an embodiment using only visible light, can analyze colors in the images to determine where watering is needed. The analysis can include information about plant colors and green saturation conditions. The irrigation system, in an embodiment, may include a sensor that senses near infrared light to improve determination of plant conditions. For example, the light filters 210 may include filters for both ranges of wavelengths. Alternatively, multiple cameras or multiple video imagers may be used. The irrigation system can use the observation that chlorophyll absorbs red and blue visible light and scatters both visible green and near infrared light to detect chlorophyll for use in determining water needs or locations. Further, the irrigation system may detect water and moisture from increased color saturation of the plants when compared to dry conditions as well as by reflection of near infrared light. The system may use a method similar to a technique for using the visible and infrared light absorption characteristics to detect vegetation described in "Vegetation Detection for Mobile Robot Navigation," David M. Bradley, Scott M. Thayer, Anthony Stentz, and Peter Rander, CMU-RI-TR-04-12, February, 2004, Carnegie Mellon University Robotic Institute, Pittsburgh, Pa. 15213. Based on chlorophyll and water detection the system can determine areas in need of watering. Similarly, the system can determine areas in need of fertilizer delivery.

Returning to FIG. 1, the sensor unit 10 can send images to the controller unit 11. Similarly, the sensor unit 10 can receive commands from the controller unit 11. For example, the sensor unit 10 may be commanded regarding a filter to use and when to acquire images. The sensor unit 10 could also be commanded to use particular pan, tilt, zoom, focus positions, and other camera settings.

The controller unit 11 may include a processor, memory, and permanent storage. The permanent storage, for example, a FLASH memory or a hard drive, may store program instructions for execution by the processor. The controller unit 11 can be co-located with other units, for example, with the sensor unit 10 or with the steerable water delivery system 12. Alternatively, the controller unit 11 can be located in a separate place away from the other units.

The irrigation system is also provided with the time of the day and its location, for example, through providing it with the correct latitude and longitude, or through its street address from which its latitude and longitude can be determined. Using this information the system is able to determine the time of day and the location of the sun in the sky to improve the processing of its sensor data and especially to correct for harsh shadows. The system may use detection of sharp shadows to aid determination of the slopes and dips of the planted area as the shadow shape sweeps across the area.

Under a normal operating mode, the system continually or repeatedly takes images of the planted area and processes the images to determine what locations in the planted area need watering or other types of care. The system can then direct its nozzle to the locations in need of water, fertilizers, or pest control solutions. The system may perform image preprocessing before vegetation detection is performed. For example, the system may perform image geometry correction, coordinate mapping, day light and color compensation, motion tracking, and 2D and 3D projections. The system may use image processing libraries, such as the OpenCV library implementation, for example, as described in the book "Learning OpenCV Computer Vision with OpenCV Library," ISBN 978-0-596-51613-0.

Figure 3:
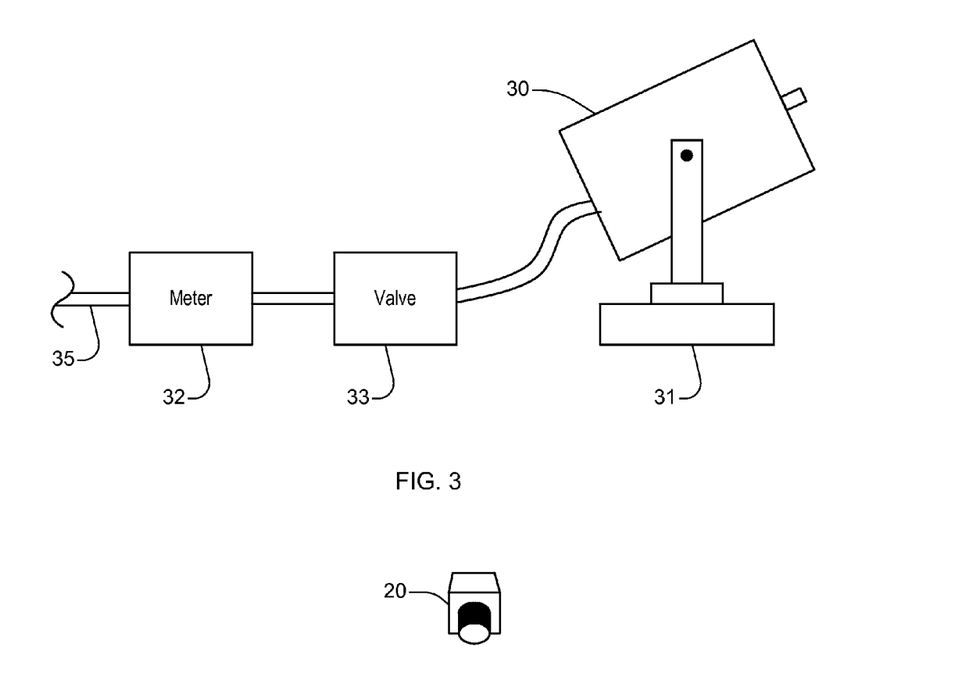
FIG. 3 is a block diagram of a steerable nozzle subsystem in accordance with aspects of the invention.

FIG. 3 is a block diagram of a steerable nozzle subsystem. The steerable water delivery system 12 of the irrigation system of FIG. 1 may be, for example, implemented using the steerable nozzle subsystem of FIG. 3. The steerable nozzle subsystem includes a water nozzle 30 that is mounted on a turret 31. The turret 31 can pan and tilt for aiming the water nozzle 30. Panning and tilting may change azimuth and elevation angles, respectively. Water is fed to the system by a water inlet 35. The water flows through a measuring device (meter) 32 to a water valve 33 to the water nozzle 30. The water valve 33 has variable positions that can adjust the water flow. The water valve 33 may, alternatively or additionally, be able to adjust the water pressure. In an embodiment, the steerable nozzle subsystem includes a sensor for water pressure. The water valve 33 can be completely closed when the irrigation system is not watering.

The steerable nozzle subsystem can provide precise water delivery. By adjusting the opening of the water valve 33, the throw distance of water from the steerable nozzle subsystem can be changed. Adjusting tilt can also change the throw distance. By panning the angle of the water nozzle 30 in the horizontal plane, the throw angle can be changed. Thus water can be directed to all of the lawn or plant areas under care of an irrigation system. In some embodiments, the steerable nozzle subsystem includes only two of panning, tilting, or valve adjustments. Tilting the water nozzle 30 can be used to help water reach its destination with less or more pressure. Water can be delivered to the same location with different combinations of openings of the water valve 33 and tilt angles of the water nozzle 30. The different settings can adjust the rate of water delivery. The settings may also affect the accuracy of the water delivery. The panning, tilting, and variable valve openings may be controlled by servo motors. The servo motors may be commanded, for example, by a main processing unit or controller of the irrigation system. Similarly, the amount of water flow to the nozzle, as measured by the measuring device 32, may also be reported to the controller unit or server.

The water nozzle 30, in an embodiment, is a laminar flow nozzle that delivers water in a laminar flow. Thus, the water delivered from the water nozzle 30 can be a continuous glass-rod-like stream. Being laminar, the stream does not spread in diameter and does not breakup in the air into scattered droplets. The point of water delivery therefore can be accurate with little splashing and spreading dispersion. In addition, variations in the laminar stream's landing point, for example, due to wind or pressure variations, are easily corrected by the irrigation system because of the single point of landing and minimum spreading of the landing point. Other nozzle types may also be used. For example, when the distance water is delivered from the nozzle is small, dispersion in a stream that is not laminar can be small.

The steerable nozzle subsystem may include illumination of the water stream. For example, a light source may be included in the water nozzle 30. The light source may be, for example, a light-emitting diode (LED) or other type of light bulb. The water stream, being of laminar form, will generally retain the light. The light may be of color that makes the stream stand out more in an image. For example, the color may be chosen taking into consideration the spectral response of a sensor unit used in the irrigation system. The water stream serves as a light pipe, and the light that tunnels through the stream can vividly light up the point of landing making it more easily detectable by a sensor. Therefore, an irrigation system can more easily adjust the trajectory of the water stream for accurate delivery of water to the desired spots. Injecting colored light in the water stream may use techniques similar to those used for decorative water fountains.

The steerable nozzle subsystem may be able to deliver other materials in place of or with the water. For example, a fertilizer, a pesticide, or combination of materials may be selectably added to the water stream.

Returning again to FIG. 1, the irrigation system can operate in multiple modes. Control of the operating modes may be from the controller unit 11, the server 14, or a combination. A first mode is a setup mode; a second mode is a running mode. The setup mode can be used during installation of the irrigation system. The running mode is used during day-to-day operation of the irrigation system.

The setup mode may perform an algorithm that begins with a task to determine the extents and type of areas in the planted area. A method of determining the planted area is to paint the perimeter of the planted area using bright color paint that the system can easily pick out from an image taken by the sensor unit 10. The system can detect the painted perimeter. Refinement of the location information may be, for example, performed at the server 14. Another method of determining the planted area uses virtual painting where a user can, using a software tool, draw an overlay perimeter on an image taken by the sensor unit 10. The information is then returned to the system including the location of the overlaid perimeter. Even after the system detects the perimeter in one of the images, the physical location of the sensor unit 10 and its angle relative to the planted area may not be fully determined. This may occur, for example, when the planted area is not flat or level. Additionally, a reference object may not be available in the image to determine distances from image scale. However, the system may properly operate without full knowledge of the physical relationships between the sensor camera and the planted area. Since the system can monitor where water lands for a given nozzle angle and valve opening, the steerable water delivery system 12 can easily be adjusted so that the water lands on the part of the image where the system had detected that the planted area needs watering. That is, the irrigation can direct the watering with closed-loop control.

The setup mode algorithm may continue with a task that shoots water from the steerable water delivery system 12 to a number of locations within the planted area. The task monitors via the sensor unit 10 where the water lands. This serves as a rough calibration of the correlation between the nozzle angles and variable valve positions and where the water lands within the planted area. Even if the steerable water delivery system 12 is not within the field of view of the sensor unit 10, the calibration task can still determine the position of the steerable water delivery system 12 relative to the planted area by noting where the water lands during this calibration process. For example, the irrigation system may observe the water stream from the steerable water delivery system 12 at two nozzle pan angles to deduce the position of the steerable water delivery system 12, whether in or out of view, relative to the plane of the image by determining the point of intersection of the two water streams. If the angle of the camera is such that the arc of the stream is visible and hence might confuse this deduction, the system can adjust the throw of the water to give two points for each nozzle pan angle. Drawing a straight line between each of the two landing points from the same nozzle angle gives a line that extends back over the location of the steerable water delivery system 12. The point of intersection of two lines at different nozzle angles determines the nozzle location relative to the image frame. This determination is useful in determining whether the pan or tilt angle of the nozzle needs to be increased or decreased or whether the water throw should be increased or decreased in order for the water landing spot to get closer to the desired location within the planted area. More than two observations of the water stream from the nozzle may also be used in other ways, for example, to compensate for errors in measurements, in determining the position of the nozzle.

From the above, it can be seen that there are advantageous locations for the steerable water delivery system 12 or the sensor unit 10 in relation to each other and in relation to the planted area. The irrigation system may be improved when the sensor unit 10 is at a location that enables the sensor unit 10 to image all the planted area. Similarly, the irrigation system may be improved when the steerable water delivery system 12 is at a location from which water can be delivered to anywhere within the planted area.

The irrigation system of FIG. 1 and the related subsystems of FIGS. 2 and 3 are illustrated with single instances of each of the items. Many other arrangements may be used. For example, the irrigation system may have multiple steerable water delivery systems, multiple sensor units, or multiples of both to facilitate full imaging and water coverage of the planted area. Such irrigations systems may be applied, for example, when the planted area is of a large size or has shapes and slopes that are challenging to serve using a single image sensor or a single steerable water delivery system. Multiple installations of the irrigation system in one region may be linked to a server for combined data analysis. More installations of the system in the same geographic region connected to the same server can allow more accurate care for the planted areas due the availability of wide area data. Similarly, a particular allocation of functions to the various systems and subsystems has been described. Many other arrangements may also be used. For example, some functions attributed to the controller unit 11 may be performed by the sensor unit 10 or the steerable water delivery system 12.

Figure 4:
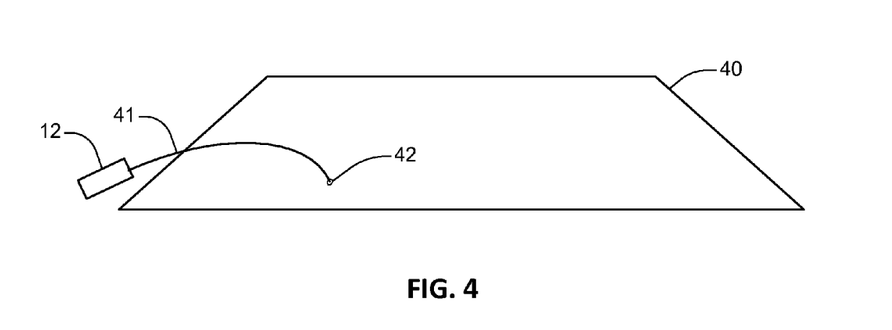
FIG. 4 is a perspective view of an example installation of the irrigation system of FIG. 1 in accordance with aspects of the invention.

FIG. 4 is a perspective view of an example installation of the irrigation system of FIG. 1. The example installation shows the sensor unit 10 and the steerable water delivery system 12 in relation to a planted area 40. "Planted area" is used in the interest of concision to refer to the area that an irrigation system waters or the area under care of an irrigation system. The term "irrigation area" may also be used. The planted area may include portions that are not irrigated, such as hardscape. The example installation also shows a trajectory of a water stream 41 exiting the steerable water delivery system 12 that is directed to a landing point 42 within the planted area 40.

For ease of illustration, the planted area 40 that is illustrated has a simple shape. The described irrigation systems are not so limited. Additionally, many variations in the position of the sensor unit 10 and the steerable water delivery system 12 in the example installation of FIG. 4 may be used. For example, the steerable water delivery system 12 can be located within the planted area 40.

Figure 5:
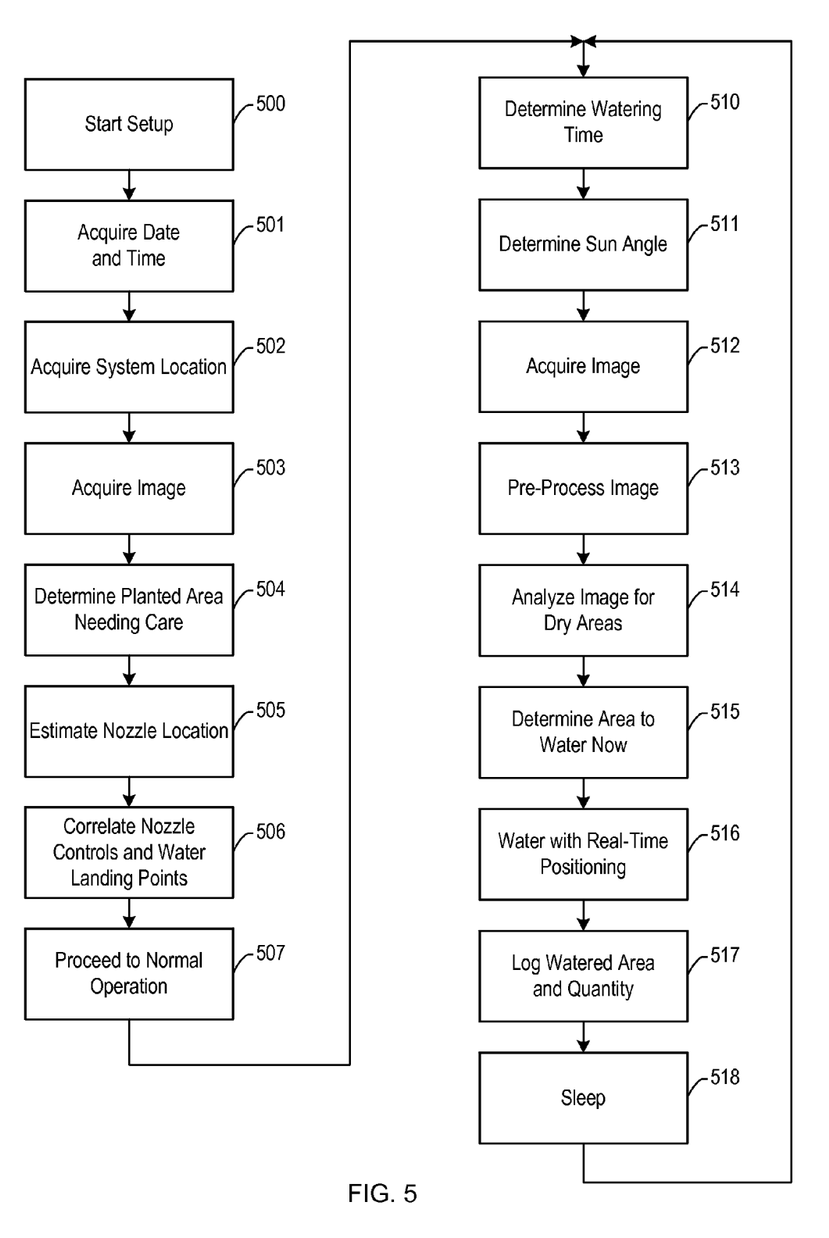
FIG. 5 is a flowchart of an irrigation process in accordance with aspects of the invention.

FIG. 5 is a flowchart of an irrigation process. The irrigation process may be performed, for example, by the irrigation system of FIG. 1.

At step 500, the process enters a setup mode. The process may, for example, enter the setup mode when the irrigation system is started for the first time.

At step 501, the process acquires the date and time. This could be done by prompting the user to enter the date and time, for example, through a control panel or remotely through the user's personal computer, smart phone, or the like. Depending on capabilities of the irrigation system, the process may acquire the date and from a local real-time clock. The clock may be set, for example, via a global positioning system (GPS) receiver module. The clock could also be set via a wireless receiver tuned to a clock broadcast, such as the U.S. National Institute of Standards and Technology (NIST) clock broadcasts. The process could also acquire the date and time via the Internet.

In step 502 the process acquires the location of the irrigation system. The location may be in terms of latitude and longitude. Similar to the date and time in step 501, the process can acquire the location by various methods. For example, the process can prompt the user to enter the information. User-entered information may be, for example, a postal street address. The process may then convert the address to latitude and longitude, for example, by Internet lookup. The location can also be automatically approximated through an Internet connection using the IP address. When available, the process may use a connected GPS module. The location and the date and time are used in subsequent process steps, for example, for information about current and forecasted weather and to predict shadows that might affect the image processing. For example, if rain is predicted in the near future, the process may delay watering even though rain has not occurred yet.

In step 503, the process takes one or several images, for example, using the sensor unit 10. Prior to taking an image, an installer of the irrigation system may have marked the planted area for use in determining the planted area. The marking can be a contrasting color relative to the planted area, for example, a bright paint.

In step 504, the process determines the extent of the planted area. In an embodiment, the image or images taken in step 503 could be transmitted to the server 14 where the user could either edit or add new boundaries for the planted area (which may have sub-areas that are not contiguous) in the image and that information is sent back to the system.

In step 505, the process estimates the location of the water nozzle relative to the planted area. Process may do this by shooting water streams at various nozzle angles and valve settings, noting where the water lands, and calculating from this information where the water nozzle is located.

In step 506, the process shoots water to a number of points in the planted area and detects where the water lands. The process uses this information to correlate the nozzle angles and valve settings with the water landing points. During this process, the pressure of the water that is supplied to the water nozzle may be measured so that compensation for varying water pressure can be performed during future operation.

In step 507, the process saves all the calibration and setup information determined during the setup mode steps. The process can proceed to normal operation mode by continuing to step 510.

In normal operating mode, the process loops repeatedly through steps 510-518. In step 510, the process determines if the current time is appropriate for watering. This may be based on time of day, time of last watering, restrictions (e.g., municipal laws) on watering days due to drought conditions or the like. The process may also consider what time of the day for watering is advantageous, for example, to reduce evaporation and reduce pest growth. The process can further consider current, previous, or future weather conditions, for example, to take advantage of rain water. Watering time could also be affected by sun exposure. For example, the process may advance or retard watering based on an amount of sun exposure during the past few days. The sun exposure may be detected using the irrigation system's sensor unit 10 or via weather information, for example, obtained via the Internet. Even if it turns out that now is not an appropriate time for watering, the process, in an embodiment, proceeds with the subsequent steps in the loop of the normal operation mode.

In step 511, the process uses the time and date and the latitude and longitude of the system to calculate the current position of the sun relative to the planted area and relative to the sensor unit. The sharpness and contrast of shadows in acquired images can help in estimating the intensity of sun exposure. The process stores this information so that it can also better predict shadow locations within the images to aid in detecting dry areas.

In step 512, the process acquires one or several images. The images may be obtained using visible light only or the images may be multi-spectral images.

In step 513, process processes the images. The process may correct and enhance the images, for example, to compensate for variable lighting (which may vary daily and seasonally) and for geometric distortions due to camera orientation or imperfect optics.

In step 514 the process determines which locations in the planted area need watering. The process may use a vegetation detection method, for example, one or more of the vegetation detection similar to techniques described in papers referenced above.

Process may, in an embodiment, increase the accuracy of moisture detection using thermal inertia processing. Moist plants and soil have higher thermal inertia than dry plants and soil. This means that when surface temperature data (e.g., determined from a temperature collecting sensor or infrared camera) is collected at multiple times during a given day, moist and green plant areas will show lower temperature fluctuation extremes during the whole night and day cycle. Wet and moist areas are cooler in the day and warmer at night compared to drier areas. Similar methods may be use to determine areas with pavement or walls. The system can use the thermal inertia processing information to determine the areas in need of water.

In step 515, after the locations that need water (stressed vegetation areas) are determined, the process determines whether to water the stressed vegetation areas now. The process can use general information from step 510 and specific information for each stressed vegetation area that it has in a database. For example, if a stressed vegetation area had been watered fairly recently, the process would not water that area again even though it may still look stressed. This allows time for plant greenness to change after watering. In addition, if a given location has been watered repeatedly and still shows signs of stress, then the process may stop watering that location again and signal a problem to the user that the specific location needs gardening attention. The amount of repeated watering before the process stops watering a location may depend, for example, on characteristics of plants in that location.

In step 516, the process waters locations as determined in step 515. The process sets the nozzle angles and the variable valve position to estimated settings to water a specific location. The process can repeatedly acquire and detect the water landing point and make adjustment to correct for any water landing point offset errors. The process proceeds to water the desired location for a given period of time. The period of time is a function of the variables described above and the type and nature of the plant or plants being watered. Alternatively or additionally, the process may water the desired location until a desired volume of water has been delivered.

In step 517, the process logs which locations were watered and by how much so that this information can be used in future iterations of the system algorithm.

In step 518, the process goes to sleep, for example, for a few minutes. Thereafter the process returns again to step 510.

In various embodiments, some or all of the steps mentioned above could be done at a local processing unit of the irrigation system or on a server, for example, with a large database residing somewhere in an internet cloud.

The irrigation process of FIG. 5 can be modified by adding, omitting, reordering, or altering steps. For example, an irrigation system can provide basic functions without date, time, or location information (although performance may be greatly improved by having this information). Accordingly, the process, in an embodiment, omits step 501 and step 502. The process achieves an overall objective of watering a specific spot within a planted area by processing an image taken of the spot and directing water to that spot while taking into account other external and weather conditions to result in very efficient usage of water.

Many further variations of the described irrigation systems and methods can be used. For example, an irrigation system can use microwave radio waves to detect the moisture content of the soil or plants under the system's care. The system emits a microwave signal modulated by a predetermined pseudo random digital pattern and waits for returns from the area. In an embodiment, the system can be passive and rely only on the naturally occurring microwave reflected from the plants. The irrigation system performs signal processing between the emitted and return signals, or just processing of the return signals in case of a passive system, and estimates the strength of the returned echo.

The dielectric constant for water with radio waves up to and beyond microwave frequencies in the 400 MHz to 3 GHz range is around 80 while dry soil has a dielectric constant of about 3 at the same frequencies. This difference results in a measurable difference of the back scattering of microwave energy from wet and vegetated areas compared to dry plant and soil areas. Compared to using a camera, microwave (having much longer wavelengths than optical frequencies) can detect water deeper within the soil rather than what is on the surface. However the spatial resolution of practical microwave antennas mounted to the side of the planted area may be less accurate than the spatial resolution of an optical camera. This is because a large antenna is required to focus the microwave beam to a small spot on an area that is several meters away from the antenna. Large steerable antennas can be used to give high spatial resolution with the longer wavelengths of microwaves. Phased-array flat antennas, for example, affixed to the side of the building overlooking the planted area, can be used.

The challenge of using large or complex antennas can be removed if the antenna is physically located very close to a small spot under examination. In the case of lawn areas, a low-cost, low-resolution, and low-penetration microwave radar can be mounted on a lawn mower that is used to trim the lawn area. While collecting and transmitting the ground moisture data to the main processor during mowing, the lawn mower's position is determined by the system's camera and hence the ground moisture data is correctly paired against the physical location of each collection. The data can be transmitted to the system using wired or wireless means from the device attached to the mower to the main processor. Alternately, the data can be sent to the system through an infrared link that is picked up by the camera, which may reduce cost.

Alternately, the lawn mower can also be instrumented with a radio wave emitter that is picked up by an antenna array affixed next to the area under observation. This technique can determine the position of a transmitter in three dimensions by picking up a radio signal with an antenna array, for example, similar to techniques used in smart office white boards. The antenna array is connected to a system processing unit and can accurately determine where the mower is at any instant. This information is paired with the lawn mower installed radar signal returns. By downloading the information to the system processor (while or after mowing) a very accurate determination of the soil moisture within the area is made. The system may use algorithms to determine the soil moisture content using active or passive microwave techniques similar to those summarized in the papers "Passive Microwave Remote Sensing of Soil Moisture," Eni G. Njokul and Dara Entekhabi, Jet Propulsion Laboratory, California Institute of Technology, and in "Satellite Remote Sensing Applications for Surface Soil Moisture Monitoring: A Review," Lingli Wang, John J. Qu, EastFIRE Laboratory, Environmental Science and Technology Center (ESTC), College of Science, George Mason University, Fairfax, Va. 22030, USA, and described in more detail in the references listed in these papers.

In another variation, the irrigation system has some or all of its sensors located on a flying (aerial) platform. This can be especially advantageous for large areas such as farm fields and golf courses. The flying platform may be augmented with navigation and stabilization electronics and periodically flies over the area under its care and records the sensor data. The data can be relayed to a processing unit of the system whether wirelessly or by wire once the flying platform returns to its home station. The sensor information is then processed as with other embodiments. Such flying platforms are commercially available today and are expected to become increasingly affordable as time goes by. Alternatively, the flying platform may be a tethered balloon.

In another variation, the irrigation system can connect to an internet server on the cloud. Some or all of the data collected by the various sensors of the irrigation system can be sent to the server, where some or all of the computation needed to determine plants and lawns conditions are carried out. The higher available computation power and access to wider local, regional, and national data can improve the determination. The results of the server computation are then sent back to a local processing unit of the irrigation system in order to carry out watering and fertilizer and pesticide delivery to the planted area.

Those of skill will appreciate that the various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. An irrigation system, comprising:
   an image sensor configured to capture images of an irrigation area, the irrigation area being an area to be cared for by the irrigation system;
   a steerable water delivery system configured to direct a stream of water to the irrigation area; and
   a controller unit coupled to the image sensor and the steerable water delivery system and configured to
   receive images from the image sensor,
   determine locations to water in the irrigation area,
   direct the steerable water delivery system to deliver water to the determined locations, including receiving images from the image sensor while the steerable water delivery system is directing the stream of water to the irrigation area, and controlling positioning of the steerable water delivery system using detected landing points of the stream of water.

2. The irrigation system of claim 1, wherein the image sensor comprises:
   a video imager;
   a lens system configured to direct light to the video imager; and
   a light filtering unit comprising a plurality of selectable light filters configured to filter the light spectra that are captured by the image sensor, and
   wherein the controller unit is further configured to determine the locations to water in the irrigation area using images captured using two or more of the plurality of selectable light filters.

3. The irrigation system of claim 1, wherein the steerable water delivery system comprises:
   a water nozzle configured to deliver the stream of water;
   a water valve configured to control flow to the water nozzle; and
   a turret configured to control at least one angle of the stream of water from the water nozzle.

4. The irrigation system of claim 3, wherein the stream of water is laminar.

5. The irrigation system of claim 3, wherein the steerable water delivery system further comprises a light source configured to illuminate the stream of water from the water nozzle, and wherein the controller unit is further configured to detect landing points of the stream of water by detecting illumination of the landing points by the illuminated stream of water using images from the image sensor, and to control the steerable water delivery system based at least in part on the detected landing points.

6. The irrigation system of claim 3, wherein the steerable water delivery system further comprises a meter configured to measure the flow of water from the steerable water delivery system.

7. The irrigation system of claim 1, wherein the controller unit is configured to determine the locations in the irrigation area that need watering based at least in part on the images from the image sensor.

8. The irrigation system of claim 1, wherein the controller unit is further coupled to a cloud server and is further configured to supply image data from the image sensor to the cloud server and receive information from the cloud server for use in determining the locations to water.

9. The irrigation system of claim 1, wherein the image sensor is disposed on an aerial platform.

10. A method for operating an irrigation system, the method comprising:
- determining whether the current time is appropriate for watering;
- acquiring one or more images of an irrigation area, the irrigation area being an area to be cared for by the irrigation system;
- determining locations in the irrigation area that need watering based at least in part on the acquired images;
- determining whether to water the locations determined to need watering; and
- watering the determined locations, when it is determined to water the locations determined to need watering, watering the determined locations including
  - directing a steerable water delivery system to deliver water to the determined locations,
  - acquiring one or more images of the irrigation area while the steerable water delivery system is delivering water to the determined locations,
  - detecting landing points of the delivered water using the one or more images acquired while of the irrigation area while the steerable water delivery system is delivering water, and
  - controlling positioning of the steerable water delivery system using the detected landing points.

11. The method of claim 10, wherein determining whether the current time is appropriate for watering is based at least in part on weather information.

12. The method of claim 10, wherein acquiring one or more images of an irrigation area comprises acquiring the images at a plurality spectra.

13. The method of claim 10, wherein the captured images include infrared images captured at different times of day, and wherein determining locations in the irrigation area that need watering comprises using thermal inertia processing of infrared images.

14. The method of claim 10, wherein determining whether to water the locations determined to need watering comprises detecting a stressed condition by determining whether one of the locations determined to need watering has been watered repeatedly and still needs watering, and when a stressed condition is detected, signaling a user that the stressed condition was detected.

15. The method of claim 10, wherein determining locations in the irrigation area that need watering based at least in part on the acquired images comprises enhancing the acquired images using information about the current position of the sun relative to the irrigation area.

16. The method of claim 10, wherein determining locations in the irrigation area that need watering comprises analyzing a microwave signal to detect moisture.

17. A method for use in setting up an irrigation system, the method comprising:
- acquiring one or more images of an irrigation area using an image sensor, the irrigation area being an area to be cared for by the irrigation system;
- determining the extent of the irrigation area based at least in part on the acquired images;
- estimating the location of a steerable water delivery system relative to the irrigation area;
- directing the steerable water delivery system to deliver water to a plurality of points in the irrigation area;
- acquiring one or more images of the irrigation area while the steerable water delivery system is delivering water to the plurality of points in the irrigation area;
- detecting landing points of the delivered water using the one or more images acquired while of the irrigation area while the steerable water delivery system is delivering water;
- determining landing points of the delivered water the one or more images of the irrigation area acquired while of the irrigation area while the steerable water delivery system is delivering water;
- determining calibration information for the steerable water delivery system using the determined landing points; and
- saving the calibration information and the extent of the irrigation area for use in operating the irrigation system.

18. The method of claim 17, further comprising:
determining the current date and time; and
determining the location of the irrigation area.

19. The method of claim 17, further comprising marking boundaries of the irrigation area with a contrasting color relative to colors of the irrigation area, and wherein determining the extent of the irrigation area comprises detecting the contrasting color in the images of the irrigation area.

* * * * *